(12) United States Patent
Roy

(10) Patent No.: US 10,284,482 B2
(45) Date of Patent: May 7, 2019

(54) STATEFUL CONNECTIONLESS OVERLAY PROTOCOL FOR INFORMATION TRANSFER ACROSS MULTIPLE DATALINKS

(75) Inventor: Aloke Roy, Gaithersburg, MD (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 961 days.

(21) Appl. No.: 13/537,485

(22) Filed: Jun. 29, 2012

(65) Prior Publication Data

US 2014/0003335 A1    Jan. 2, 2014

(51) Int. Cl.
*H04L 12/801* (2013.01)
*H04L 29/06* (2006.01)
*H04B 7/185* (2006.01)

(52) U.S. Cl.
CPC ......... *H04L 47/34* (2013.01); *H04B 7/18506* (2013.01); *H04L 69/14* (2013.01)

(58) Field of Classification Search
None
See application file for complete search history.

(56) References Cited

U.S. PATENT DOCUMENTS

| | | | |
|---|---|---|---|
| 4,703,475 A | 10/1987 | Dretzka et al. | |
| 6,169,881 B1 * | 1/2001 | Astrom | H04B 7/18519 455/12.1 |
| 6,549,162 B1 | 4/2003 | Gage et al. | |
| 7,027,402 B2 | 4/2006 | Hedden | |
| 7,719,441 B1 | 5/2010 | Dong | |
| 7,729,263 B2 | 6/2010 | True et al. | |
| 2002/0072332 A1 * | 6/2002 | Chang et al. | 455/66 |
| 2006/0133365 A1 * | 6/2006 | Manjunatha et al. | 370/389 |
| 2006/0159020 A1 * | 7/2006 | Porat | H04L 41/0803 370/235 |

(Continued)

FOREIGN PATENT DOCUMENTS

| | | |
|---|---|---|
| JP | 62277829 | 12/1987 |
| JP | 2001168938 | 6/2001 |

(Continued)

OTHER PUBLICATIONS

European Patent Office, "Office Action", "from Foreign Counterpart of U.S. Appl. No. 13/537,485", dated Sep. 9, 2013, pp. 1-6, Published in: EP.
European Patent Office, "European Search Report", "from Foreign Counterpart of U.S. Appl. No. 13/537,485", dated Aug. 14, 2013, pp. 1-3, Published in: EP.

(Continued)

*Primary Examiner* — Ayaz R Sheikh
*Assistant Examiner* — Mariela Vidal Carpio
(74) *Attorney, Agent, or Firm* — Bookoff McAndrews, PLLC

(57) ABSTRACT

A method and system for data communications is provided. The method reduces the overall transmission time of the information to a destination by simultaneously sending different segments of the information over a plurality of data connections. The method comprises presenting information content for transmission to a destination entity, and simultaneously sending different segments of the information over a plurality of data link connections. All segments of the information are received from the plurality of data link connections at the destination entity, and the data segments are reconstructed back into the information content at the destination entity.

13 Claims, 3 Drawing Sheets

(56) References Cited

U.S. PATENT DOCUMENTS

| | | | |
|---|---|---|---|
| 2008/0095189 A1* | 4/2008 | Frazier et al. | 370/469 |
| 2008/0186973 A1 | 8/2008 | Shihara et al. | |
| 2010/0287296 A1 | 11/2010 | Riggert et al. | |
| 2010/0293292 A1* | 11/2010 | Tamalet | H04B 7/18506 709/238 |
| 2011/0064091 A1* | 3/2011 | Darras | H04J 3/0673 370/458 |
| 2011/0075672 A1* | 3/2011 | Hodges | H04L 12/14 370/400 |
| 2011/0090984 A1 | 4/2011 | Stayton | |
| 2012/0131210 A1* | 5/2012 | Hegde | H04L 61/6063 709/228 |
| 2012/0155438 A1* | 6/2012 | Shin et al. | 370/336 |
| 2013/0156005 A1* | 6/2013 | Li | H04L 5/001 370/331 |
| 2013/0322436 A1* | 12/2013 | Wijnands | H04L 45/20 370/389 |

FOREIGN PATENT DOCUMENTS

| | | |
|---|---|---|
| JP | 2005159433 | 6/2005 |
| JP | 2006060579 | 3/2006 |
| JP | 2011049659 | 3/2011 |
| TW | 200824365 | 6/2008 |
| WO | 2007063585 A1 | 6/2007 |

OTHER PUBLICATIONS

Taiwan Patent Office, "Office Action from TW Application No. 102123343, dated Jun. 16, 2017", from Foreign Counterpart of U.S. Appl. No. 13/537,485, dated Jun. 16, 2017, pp. 1-11.

State Intellectual Property Office, P.R. China, "Second Office Action for CN Application No. 201310265736.7", Foreign Counterpart to U.S. Appl. No. 13/537,485, dated Feb. 12, 2018, pp. 1-8, Published in: CN.

Japan Patent Office, "Reason for Rejection for JP App No. 2013-127552", Foreign Counterpart to U.S. Appl. No. 13/537,485, dated Mar. 30, 2018, pp. 1-5, Published in: JP.

Taniguchi et al. "A Study of Packet Distribution Method for Packet Order Maintenance in Cognitive Radio", IPSJ SIG Technical Report, Dated May 18, 2006, pp. Translation, 55-60, vol. 2006, No. 50, Publisher: Information Processing Society of Japan, Tokyo, Japan.

Japan Patent Office, "Notice of Reason for Rejection for JP Application No. 2013-127552, dated Aug. 8, 2017", Foreign Counterpart to U.S. Appl. No. 13/537,485, dated Aug. 8, 2017, pp. 1-7, Published in: JP.

Intellectual Property Office of ROC (Taiwan), "Office Action for ROC (Taiwan) Application No. 102123343", Foreign Counterpart to U.S. Appl. No. 13/537,485, dated Dec. 8, 2017, pp. 1-12, Published in: TW.

ROC (Taiwan) Patent Application No. 102123343, dated Jul. 9, 2018, p. 1-8.

* cited by examiner

STATEFUL CONNECTIONLESS OVERLAY PROTOCOL FOR INFORMATION TRANSFER ACROSS MULTIPLE DATALINKS

BACKGROUND

Future communications between aircraft and ground automation systems will be conducted primarily over the VHF Digital Link Mode 2 (VDLM2) and satellite communications (SATCOM) data links. Additional communication options may be available for operational control depending on the in-flight entertainment (IFE) or other passenger systems installed on aircraft.

Unfortunately, current designs typically accommodate active data transfer over one communication channel regardless of the number of connectivity options that are available on the aircraft. The VDLM2 and SATCOM data links, as well as cellular telephony, all employ some mechanism to switch link connectivity seamlessly within the respective media as the mobile station transitions from one cellular coverage region to another. Nevertheless, if a communication fails on the currently selected channel, the capability does not exist to switch the data stream transparently to another active communication channel. When a data transfer fails mid-stream, dataflow over the selected medium/connection is terminated, and upper layer recovery mechanisms are invoked, which switch to a different media/channel and restart the whole data transfer. Such an approach reduces communication systems availability and increases end-to-end transit delay.

SUMMARY

A method and system for data communications is provided. The method comprises presenting information content for transmission to a destination entity, and simultaneously sending different segments of the information over a plurality of data link connections. All segments of the information are received from the plurality of data link connections at the destination entity, and the data segments are reconstructed back into the information content at the destination entity.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
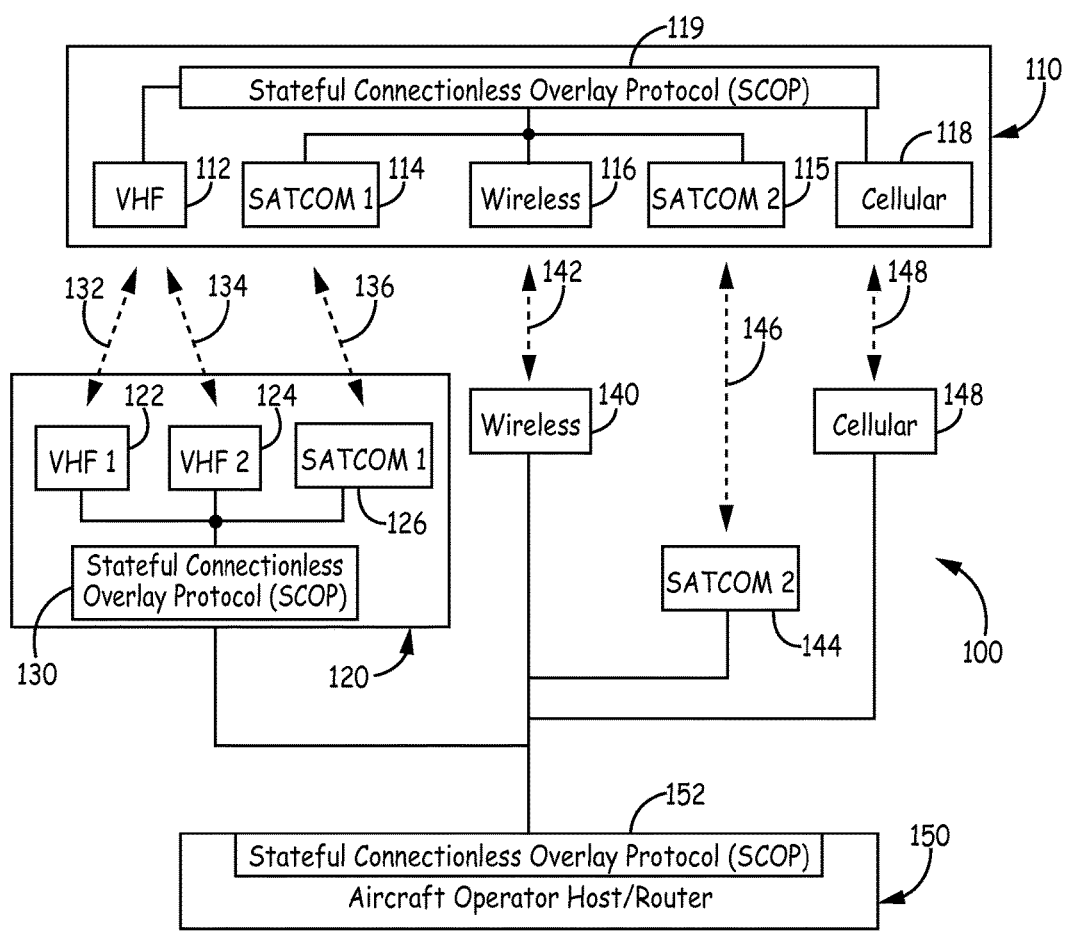
FIG. 1 is a block diagram of a data communication network for aircraft according to one embodiment, which can implement a stateful connectionless overlay protocol.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for data communications is provided that allows information to be transferred across multiple data links simultaneously. The method reduces the overall transmission time of the information to a destination by simultaneously sending different segments of the information over the multiple data links.

The method and system can be implemented with a stateful connectionless overlay protocol (SCOP), which resides above the link divergence on airborne and ground entities. The SCOP implements a routing algorithm that sends segmented information across multiple dissimilar subnetworks at the same time using different data links. If one of the data links fails, the overlay protocol keeps sending the information over the remaining data links until the information is delivered.

The present approach maximizes data throughput when multiple dissimilar subnetworks are available. The present method allows routers making air/ground subnetwork selection to maximize throughput and optimize large message transfer time by sending segmented data packets simultaneously over all available subnetworks while measuring transmit time and quality of service (QoS) to assist in subnetwork packet routing selections. By simultaneous use of available links and dynamic estimation of QoS, the present overlay protocol improves reliability and resolves the "make-before-break" problem faced by data link primary Air Traffic Control (ATC) operations, in which a communication must be completed before the connection is broken or else the whole data transfer is started over. The overlay protocol routes data to a destination across all available connectivity options, thereby eliminating the "make-before-break" requirement. The overlay protocol can operate effectively over links/networks having very different QoS performance characteristics.

When information is presented to the overlay protocol for transmission, that information is fragmented into data segments based on available connectivity choices, and one data segment is sent over a connection. The overlay protocol may send the next and subsequent data segments simultaneously across all other available connections. These connections can be over the same media, such as one or more Very High Frequency (VHF) radios connected simultaneously to one or more VHF ground stations, or over different media, such as VHF, SATCOM and wireless.

Each of the data segments can be tagged by the media/connection identification (ID) and its own sequence number for reassembly at a peer entity. Each of the data segments may also be given a lifetime based on the expected transit delay to reach the destination entity.

The receiving entity reassembles the data segments for delivery to the network upper layers. The overlay protocol can request retransmission of any missing data segment using the expected lifetime for the chosen media. A data segment whose lifetime has exceeded can be discarded by any intermediate delivery points. The overlay protocol can also use the Global Positioning System (GPS) or any other mechanism to obtain synchronized time to compute/estimate one-way transit delays over each media/connection and uses that information for routing subsequent data segments.

The overlay protocol can be implemented in software running on various computing platforms, or can be implemented in various hardware configurations.

FIG. 1 is a block diagram of a data communication network 100 for an aircraft 110 according to one embodiment, which can implement the present stateful connectionless overlay protocol. In general, the overlay protocol tracks and maintains a protocol data unit (PDU) delivery status across each air/ground data link connection in network 100. In a layered network, a PDU is a unit of data that is specified in a protocol of a given layer. The corresponding layers in each network system are called peer entities. The overlay protocol can maintain relationships with multiple peer entities.

The aircraft 110 includes a data communications system having various data communication devices. For example, as shown in FIG. 1, aircraft 110 can have a VHF transceiver 112, a first SATCOM transceiver 114, a second SATCOM transceiver 115, a wireless transceiver 116, and a cellular transceiver 118. It should be understood that aircraft 110 can be provided with more or less data communication devices than those shown. A stateful connectionless overlay protocol 119 is implemented in aircraft 110 such as in the aircraft avionics operated by an onboard computer. The overlay protocol 119 operatively communicates with the various transceivers in aircraft 110 to manage data transfer.

The data communication network 100 includes one or more digital service providers. For example, a digital service provider (DSP) 120 can have a first VHF ground station 122, a second VHF ground station 124, and a first SATCOM ground station 126. The VHF ground stations 122 and 124 can provide simultaneous connectivity to VHF transceiver 112 of aircraft 110 over VHF data links 132 and 134, respectively. The SATCOM ground station 126 provides connectivity to SATCOM transceiver 114 of aircraft 110 over a first SATCOM data link 136. A stateful connectionless overlay protocol 130 is implemented in DSP 120 so as to operatively communicate with VHF ground stations 122 and 124, as well as with SATCOM ground station 126. The DSP 120 can provide simultaneous connectivity to aircraft 110 over VHF data links 132, 134, and SATCOM data link 136. The overlay protocol 130 manages the data transfer over these data links.

In addition, network 100 can include other digital service providers. For example, a DSP 140 can have a wireless ground station, which provides connectivity to wireless transceiver 116 of aircraft 110 over a wireless data link 142. A DSP 144 can provide a second SATCOM ground station, which provides connectivity to SATCOM transceiver 115 of aircraft 110 over a second SATCOM data link 146. A DSP 148 can have a cellular ground station, which provides connectivity to cellular transceiver 118 of aircraft 110 over a cellular data link 148.

An aircraft operator host/router 150 in network 100 can also implement a stateful connectionless overlay protocol 152 as part of data communications system. The aircraft 110 can transmit and receive data communications to and from aircraft operator host/router 150 through the various digital service providers as shown in FIG. 1. For example, the host/router 150 can communicate with aircraft 110 via the first and second VHF data links 132 and 134, the first and second SATCOM data links 136 and 146, the wireless data link 142, or the cellular data link 148, at any given instant. The overlay protocol 152 manages the information exchange end-to-end between aircraft 110 and host/router 150.

In order for the overlay protocol to work reliably across dissimilar media having substantially different capabilities, the underlying data links should provide link state and QoS data. In addition, the overlay protocol dynamically estimates the throughput and one-way transit delay over each data link and provides feedback to a respective peer entity for active connectivity management.

Figure 2:
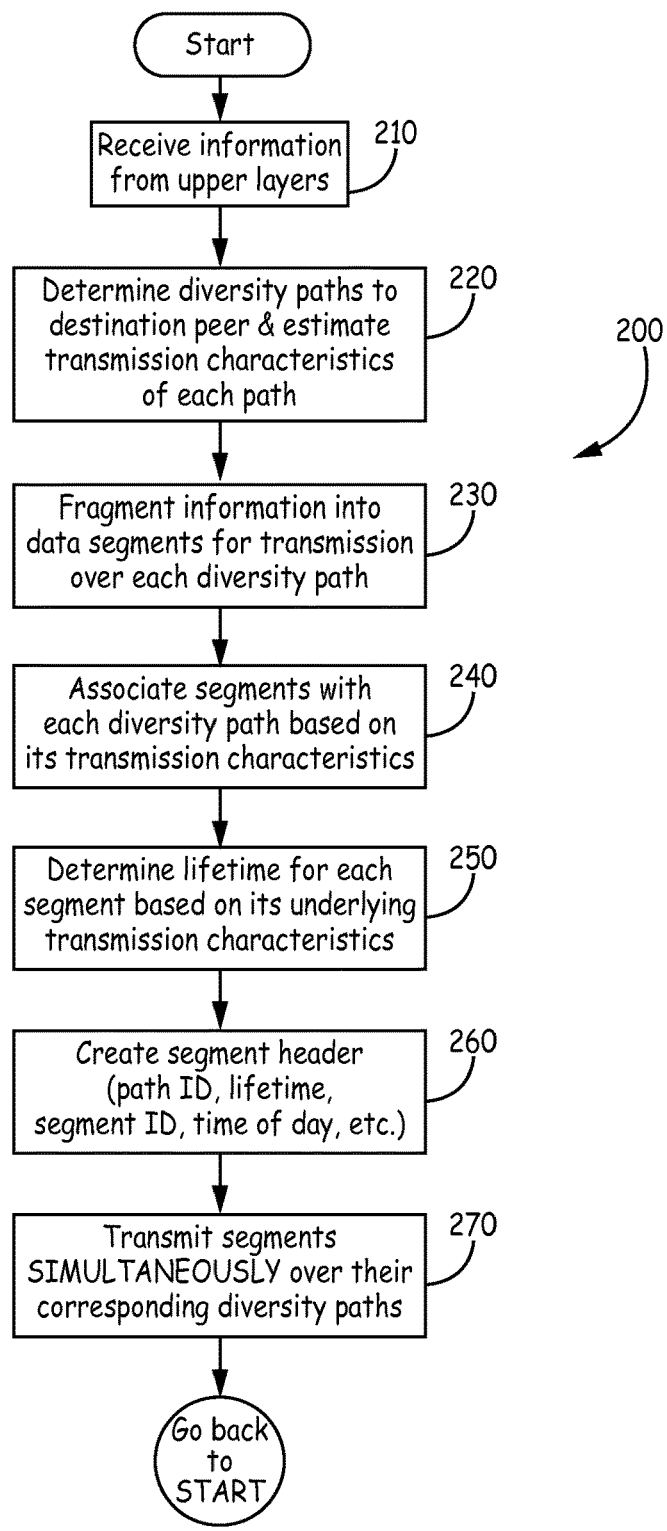
FIG. 2 is a flow diagram of an exemplary data transmission process performed by the stateful connectionless overlay protocol.

FIG. 2 is a flow diagram of an exemplary data transmission process 200 that is carried out by the stateful connectionless overlay protocol. At the start of process 200, information is received from network upper layers such as the transport or application layers (block 210). The diversity paths to a destination peer are then determined, and the transmission characteristics of each path are estimated (block 220). As used herein, a "diversity path" is a connectivity option to the destination peer when multiple connectivity options exist between them. The path transmission characteristics include, for example, one way transit delay, average throughput, aggregate bit error rate (BER), etc. The information is then fragmented into separate data segments for transmission over each diversity path (block 230). The data segments are associated with each diversity path based on the path transmission characteristics (block 240). A lifetime for each data segment is determined based on the underlying transmission characteristics of each segment such as transit delay and BER (block 250). A segment header may be created, which may include path ID, lifetime, segment ID, time of day, etc. (block 260). The data segments are then transmitted simultaneously over their corresponding diversity paths (block 270). The process 200 then goes back to the start for transmission of additional information.

Figure 3:
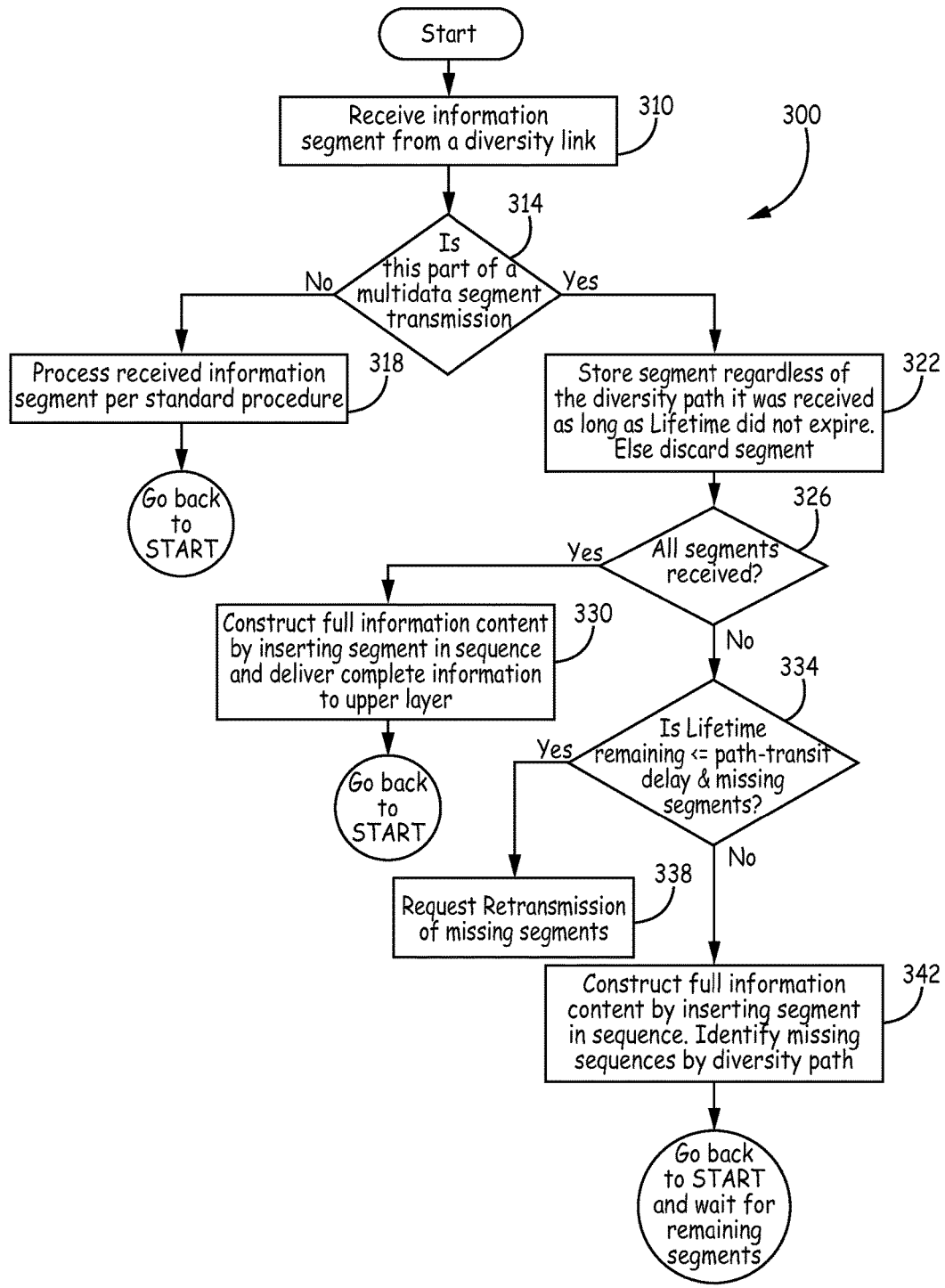
FIG. 3 is a flow diagram of an exemplary data receiving process performed by the stateful connectionless overlay protocol.

FIG. 3 is a flow diagram of an exemplary data receiving process 300 that is carried out by the stateful connectionless overlay protocol. At the start of process 300, an uplink (or downlink) information segment is received from a diversity path (block 310). A determination is then made whether the information segment is part of a multiple data segment transmission (block 314). If not, the received information segment is processed per standard procedures (block 318), and process 300 goes back to the start to receive the next transmission. If the information segment is part of a multiple data segment transmission, the information segment is stored regardless of the diversity path it was received from as long as the lifetime of the segment has not expired; if the lifetime has expired, the segment is discarded (block 322).

A determination is then made whether all data segments have been received (block 326). If yes, the full information content is constructed by inserting the segments in sequence, and the complete information is delivered to the network upper layer (block 330). The stored information segments that comprise the full information content are then discarded, and process 300 goes back to the start to receive the next transmission.

If all data segments have not been received, a determination is made whether the remaining lifetime of the stored segments is less than or equal to a pre-defined threshold, such as the path-transit delay, and if there are missing segments (block 334). If yes, retransmission of the missing segments is requested (block 338); if no, the full information content is constructed by inserting the data segments in sequence, and identifying any missing sequences by the diversity path (block 342). The process 300 then goes back to the start and waits for any remaining data segments.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method for data communications, the method comprising presenting information content for transmission to a destination entity; simultaneously sending different segments of the information over a plurality of data link connections; receiving all segments of the information from the plurality of data link connections at the destination entity; and reconstructing the data segments back into the information content at the destination entity.

Example 2 includes the method of Example 1, wherein the information content is presented by an upper layer of a communications network and fragmented into a plurality of data segments.

Example 3 includes the method of Example 2, further comprising determining a diversity path for each of the data segments.

Example 4 includes the method of Example 3, further comprising estimating one or more transmission characteristics of each diversity path.

Example 5 includes the method of any of Examples 2-4, further comprising associating each data segment with a selected diversity path based on the transmission characteristics of the selected diversity path.

Example 6 includes the method of any of Examples 2-5, further comprising determining a lifetime for each data segment based on underlying transmission characteristics for each data segment.

Example 7 includes the method of any of Examples 1-6, wherein the destination entity is an aircraft.

Example 8 includes the method of any of Examples 1-6, wherein the destination entity is an aircraft operator host or a router.

Example 9 includes the method of Example 1-8, wherein the data link connections are between the aircraft and one or more digital service providers.

Example 10 includes a system for data communications, the system comprising a plurality of different data communication devices; at least one processor operatively coupled to the data communication devices; and a processor readable medium having instructions executable by the processor to perform a transmit process and a receive process for the data communication devices. The transmit process comprises receiving information from a network upper layer; determining a plurality of diversity paths to a network destination peer; fragmenting the information into data segments for transmission over each diversity path; associating each data segment with a corresponding diversity path based on transmission characteristics of the diversity path; and transmitting the data segments simultaneously over the corresponding diversity path for each data segment. The receive process comprises receiving an information segment from a diversity data link; determining whether the information segment is part of a multiple segment transmission; storing the information segment when the information segment is part of a multiple segment transmission; and determining whether all information segments of the multiple segment transmission have been received; when all information segments have been received, constructing a full information content from the information segments, and delivering the full information content to a network upper layer; when all information segments have not been received, determining whether a remaining lifetime of the received information segments is less than or equal to a pre-defined threshold and whether there are any missing information segments; requesting retransmission of missing information segments when the remaining lifetime is less than or equal to the pre-defined threshold and there are missing information segments; and constructing a full information content from the information segments when the remaining lifetime is not less than or equal to the pre-defined threshold.

Example 11 includes the system of Example 10, wherein the data communication devices are selected from the group consisting of VHF communication devices, satellite communication devices, wireless communication devices, and cellular communication devices.

Example 12 includes the system of any of Examples 10-11, wherein the transmit process and the receive process are implemented by a software overlay protocol operated by a digital service provider.

Example 13 includes the system of any of Examples 10-12, wherein the transmit process and the receive process are implemented by a software overlay protocol operated by an aircraft operator host or router.

Example 14 includes the system of any of Examples 10-13, wherein the transmit process and the receive process are implemented by a software overlay protocol operated in an aircraft.

Example 15 includes the system of any of Examples 10-14, wherein the transmit process further comprises estimating one or more transmission characteristics of each diversity path.

Example 16 includes the system of any of Examples 10-15, wherein the transmit process further comprises determining a lifetime for each data segment.

Example 17 includes the system of any of Examples 10-16, wherein the transmit process further comprises creating a header for each data segment.

Example 18 includes the system of Example 17, wherein the header includes one or more of a path identification, lifetime information, segment identification, or time of day.

Example 19 includes the system of any of Examples 10-18, wherein the information segment is stored until the remaining lifetime of the information segment has expired, or all segments of the information has been received and the full information content is delivered to the network upper layer.

Example 20 includes a computer program product, comprising a computer readable medium having instructions executable by a processor to perform a transmit process and a receive process for data communications. The transmit process comprises receiving information from a network upper layer; determining one or more diversity paths to a network destination peer; estimating one or more transmission characteristics of each diversity path; fragmenting the information into data segments for transmission over each diversity path; associating each data segment with a corresponding diversity path based on the transmission characteristics of the diversity path; determining a lifetime for each data segment based on underlying transmission characteristics of each data segment; creating a header for each data segment; and transmitting the data segments simultaneously over the corresponding diversity path for each data segment. The receive process comprises receiving an information segment from a diversity data link; determining whether the information segment is part of a multiple segment transmission; storing the information segment when the information segment is part of a multiple segment transmission, wherein the information segment is stored until a remaining lifetime of the information segment has expired; and determining whether all information segments of the multiple segment transmission have been received; when all information segments have been received, constructing a full information content from the information segments, and delivering the full information content to a network upper layer; when all information segments have not been received, determining whether the remaining lifetime of the received information segments is less than or equal to a pre-defined threshold and whether there are any missing information segments; requesting retransmission of missing information segments when the remaining lifetime is less than or equal to a pre-defined threshold and there are missing information segments; and constructing a full information content from the information segments when the remaining lifetime is not less than or equal to pre-defined threshold.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for data communications for a communications entity, the method comprising:
    by the communications entity when the communications entity is an originating entity:
        presenting information content for transmission to a destination entity in a data communications network that includes a plurality of subnetworks;
        determining a plurality of paths to the destination entity, the plurality of paths located in at least two of the plurality of subnetworks;
        estimating path transmission characteristics for the plurality of paths;
        fragmenting the information content into a plurality of first data segments;
        associating the plurality of first data segments with corresponding paths, of the plurality of paths, in at least two of the plurality of subnetworks based on the path transmission characteristics;
        creating first headers for the plurality of first data segments, the first headers including lifetimes for the plurality of first data segments determined based on the path transmission characteristics;
        transmitting the plurality of first data segments and the first headers simultaneously over the corresponding paths; and
    by the communications entity when the communications entity is the destination entity:
        receiving a plurality of second data segments and second headers from the plurality of paths;
        determining whether all second data segments of a multiple data segment transmission have been received based on the received plurality of second data segments;
        when all the second data segments are determined to have not been received:
            determining whether remaining lifetimes of the second data segments are less than or equal to one-way transit delays of paths, among the plurality of paths, that correspond to the received plurality of second data segments, the remaining lifetimes corresponding to lifetimes for the plurality of second data segments, the lifetimes for the second data segments being included in the second headers and having been determined by an originating entity that transmitted the plurality of second data segments based on the path transmission characteristics for the plurality of paths;
            when the remaining lifetimes are not less than or equal to the one-way transit delays, constructing the information content by
                inserting the second data segments in an ordered sequence,
                identifying missing segments of the multiple data segment transmission by path, among the plurality of paths, and
                waiting for the missing segments so as to complete the ordered sequence; and
        delivering the information content to a network transport layer at the destination entity based on the completion of the ordered sequence.

2. The method of claim 1, further comprising:
using a global positioning system (GPS) to obtain synchronized time to estimate the one-way transit delay.

3. The method of claim 1, wherein the communications entity is on an aircraft.

4. The method of claim 3, wherein the plurality of paths are between the aircraft and one or more digital service providers interconnected through the plurality of subnetworks.

5. The method of claim 1, wherein the communications entity is an aircraft operator host/router.

6. A system for data communications, the system comprising:
    a network entity including a plurality of data communication devices in operative communication using a plurality of subnetworks;
    at least one processor located in the network entity and operatively coupled to the plurality of data communication devices;
    a stateful connectionless overlay protocol that resides on a processor readable medium in the network entity, wherein the overlay protocol includes instructions executable by the at least one processor to perform a transmit process and a receive process for the plurality of data communication devices;

wherein the transmit process comprises:
- receiving information from a network transport layer or higher network layer;
- determining a plurality of paths to a network destination peer, the plurality of paths located in at least two of the plurality of subnetworks;
- estimating path transmission characteristics for the plurality of paths;
- fragmenting the information into a plurality of first data segments for transmission over the plurality of paths;
- associating the plurality of first data segments with corresponding paths, of the plurality of paths, in at least two of the plurality of subnetworks based on the path transmission characteristics;
- creating first headers for the plurality of first data segments, the first headers including lifetimes for the plurality of first data segments determined based on the path transmission characteristics; and
- transmitting the plurality of first data segments and the first headers simultaneously over the corresponding paths;

wherein the receive process comprises:
- receiving a second data segment from a data link;
- determining whether the second data segment is part of a multiple data segment transmission;
- storing the second data segment when the second data segment is determined to be a part of the multiple data segment transmission; and
- determining whether all second data segments and second headers of the multiple data segment transmission have been received;
- when all the second data segments are determined to have been received:
  - constructing a full information content from the second data segments by inserting the received second data segments in an ordered sequence; and
  - delivering the full information content to the network transport layer;
- when all the second data segments are determined to have not been received:
  - determining whether remaining lifetimes of the second data segments are less than or equal to one-way transit delays of paths, among the plurality of paths, that correspond to the second data segments and determining whether there are any missing data segments, the remaining lifetimes corresponding to lifetimes for the second data segments, the lifetimes for the second data segments being included in the second headers and having been determined by an originating entity that transmitted the second data segments based on the path transmission characteristics for the plurality of paths;
  - requesting retransmission of the missing second data segments, when the remaining lifetimes are less than or equal to the one-way transit delays and there are missing second data segments; and
  - when the remaining lifetimes are not less than or equal to the one-way transit delays, constructing the full information content from the received second data segments by
    - inserting the second data segments in the ordered sequence,
    - identifying missing segments of the multiple data segment transmission by path, among the plurality of paths, and
    - waiting for the missing segments so as to complete the ordered sequence.

7. The system of claim 6, wherein the plurality of data communication devices are selected from a group consisting of VHF communication devices, satellite communication devices, wireless communication devices, and cellular communication devices.

8. The system of claim 6, wherein the network entity is a digital service provider.

9. The system of claim 6, wherein the network entity is an aircraft operator host/router.

10. The system of claim 6, wherein the network entity is an aircraft.

11. The system of claim 6, wherein the transmitting the plurality of first data segments and the first headers includes transmitting a first header with each first data segment as a data packet.

12. The system of claim 11, wherein the first headers and the second headers include a path identification, the path identification indicating a path an associated data segment is to be transmitted over.

13. The system of claim 6, wherein the second data segment is stored until a remaining lifetime of the second data segment has expired, or all of the second data segments of the information has been received and the full information content is delivered.

* * * * *